(12) United States Patent
Su et al.

(10) Patent No.: US 8,144,262 B2
(45) Date of Patent: Mar. 27, 2012

(54) PROJECTION APPARATUS AND SYSTEM

(75) Inventors: Jimmy Su, Taoyuan Hsien (TW);
Wen-Chieh Kuo, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 1171 days.

(21) Appl. No.: 11/871,250

(22) Filed: Oct. 12, 2007

(65) Prior Publication Data

US 2008/0151128 A1    Jun. 26, 2008

(30) Foreign Application Priority Data

Dec. 20, 2006   (TW) ................................ 95147838 A (51) Int. Cl.
*H04N 5/64* (2006.01)
(52) U.S. Cl. ........ 348/744; 348/189; 348/586; 348/590; 348/745; 353/30
(58) Field of Classification Search .................. 348/189, 348/745, 586, 590, 744; 353/30
See application file for complete search history.

(56) References Cited

U.S. PATENT DOCUMENTS

| | | | |
|---|---|---|---|
| 6,361,173 B1 | 3/2002 | Vlahos et al. | |
| 6,789,903 B2 | 9/2004 | Parker et al. | |
| 7,133,083 B2 * | 11/2006 | Jaynes et al. | 348/745 |
| 7,163,296 B2 * | 1/2007 | Sakai | 353/69 |
| 2006/0028624 A1 * | 2/2006 | Kaise et al. | 353/85 |

OTHER PUBLICATIONS

English language translation of Taiwanese Office Action dated Jul. 27, 2009 issued in related Taiwanese Patent Application No. 982113.
Taiwanese Office Action dated Jul. 27, 2009 issued in related Taiwanese Patent Application No. 982113.

* cited by examiner

*Primary Examiner* — Kristine Kincaid
*Assistant Examiner* — Sumaiya A Chowdhury
(74) *Attorney, Agent, or Firm* — Grossman, Tucker, Perreault & Pfleger, PLLC (57) ABSTRACT

A projection apparatus comprises a receiver, a processor, and a frame projector. A sensor detects a horizontal position of a user in front of a screen and transmits a horizontal position signal. The receiver receives the horizontal position signal. The processor generates an on screen display (OSD), and superimposes the OSD onto a projection frame. The frame projector projects the superimposed frame onto the screen. During projection, the OSD covers the face of the user.

14 Claims, 7 Drawing Sheets

PROJECTION APPARATUS AND SYSTEM

This application claims the benefit of priority based on Taiwan Patent Application No. 095147838 filed on Dec. 20, 2006, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a projection apparatus and a projection system comprising the same projection apparatus. The present invention especially relates to a projection apparatus that can generate a covering frame on the presenter's body and a projection system comprising the same projection apparatus.

2. Descriptions of the Related Art

Projection apparatuses are commonly used for conveying information in presentations. Examples of such situations include educational and training courses, proposals to potential clients and marketing presentations. However, during these presentations, if the presenter faces the projection apparatus, light rays from the projection apparatus are projected into the user's eyes, causing interference with the user's vision.

A method for matting a signal used in a projector is disclosed in U.S. Pat. No. 6,361,173. According to this method, an infrared light is uniformly irradiated onto a screen to project an image thereon. An infrared sensing video camera then detects and retrieves the signal level of the pixels on the screen. The signal level of the pixels corresponding to a screen area with a clear display is stored and defined as the zero level, and therefore, can be distinguished from the non-zero levels of those pixels in a screen area corresponding to the presenter's shadow. Based on this information, the signal level in the shadow area is then suppressed, thereby, reducing the signal strength projected onto the presenter. However, this method is sensitive to the variation of indoor luminance. For example, if the door or windows are left open or the luminance of lights varies, the projector adapting this method will fail to generate the matte signals.

Another method is disclosed in U.S. Pat. No. 6,789,903, in which a pattern is projected onto a screen by an infrared light projector operating with light at invisible wavelengths. An infrared sensing video camera arranged near the projector detects and stores this pattern to generate a reference frame, which is then transferred to the projector. Subsequently, when the presenter stands in front of the screen, the pattern is projected once again onto the screen by the projector. Similarly, the video camera stores the resulting projection pattern onto the screen, and compares it to the signal obtained from the reference frame to find out the area corresponding to the presenter's shadow. The information is then transferred to the projector, which can suppress image generation in this area according to the information. However, this method requires excessively complex computations, imposing a high burden on the internal processor in the video camera. Moreover, this method further requires a video camera to detect the position of the presenter, which not only makes its operating mechanism more complex, but also increases the cost. Therefore, this method is also not convenient for users.

In summary, the existing methods for improving projection interference are either sensitive to lighting conditions or suffer from excessively complex computations and increased costs. Accordingly, it is still important to provide a projection apparatus that not only prevents the projection image from projecting into the presenter's eye, but is also cost-effective and requires only simple computational mechanisms.

SUMMARY OF THE INVENTION

One objective of this invention is to provide a projection apparatus that not only prevents the projection image from shining into presenter's eyes, but also features a simple architecture, cheap costs and low computational complexity.

For this end, the projection apparatus is connected to an external sensor for sensing the horizontal position of a user in front of the screen and for transmitting a horizontal position signal. The projection apparatus is then configured to generate a first display frame. The projection apparatus comprises a receiver, a processor, and a frame projector. The receiver is configured to receive the horizontal position signal. The processor is configured to generate a second display frame based on the horizontal position signal, and to superimpose that second display frame onto the first display frame. The frame projector is configured to project the superimposed frame on the screen. During the projection, the second display frame covers the body of the user.

Another objective of this invention is to provide a projection system that comprises the aforesaid sensor and project apparatus.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
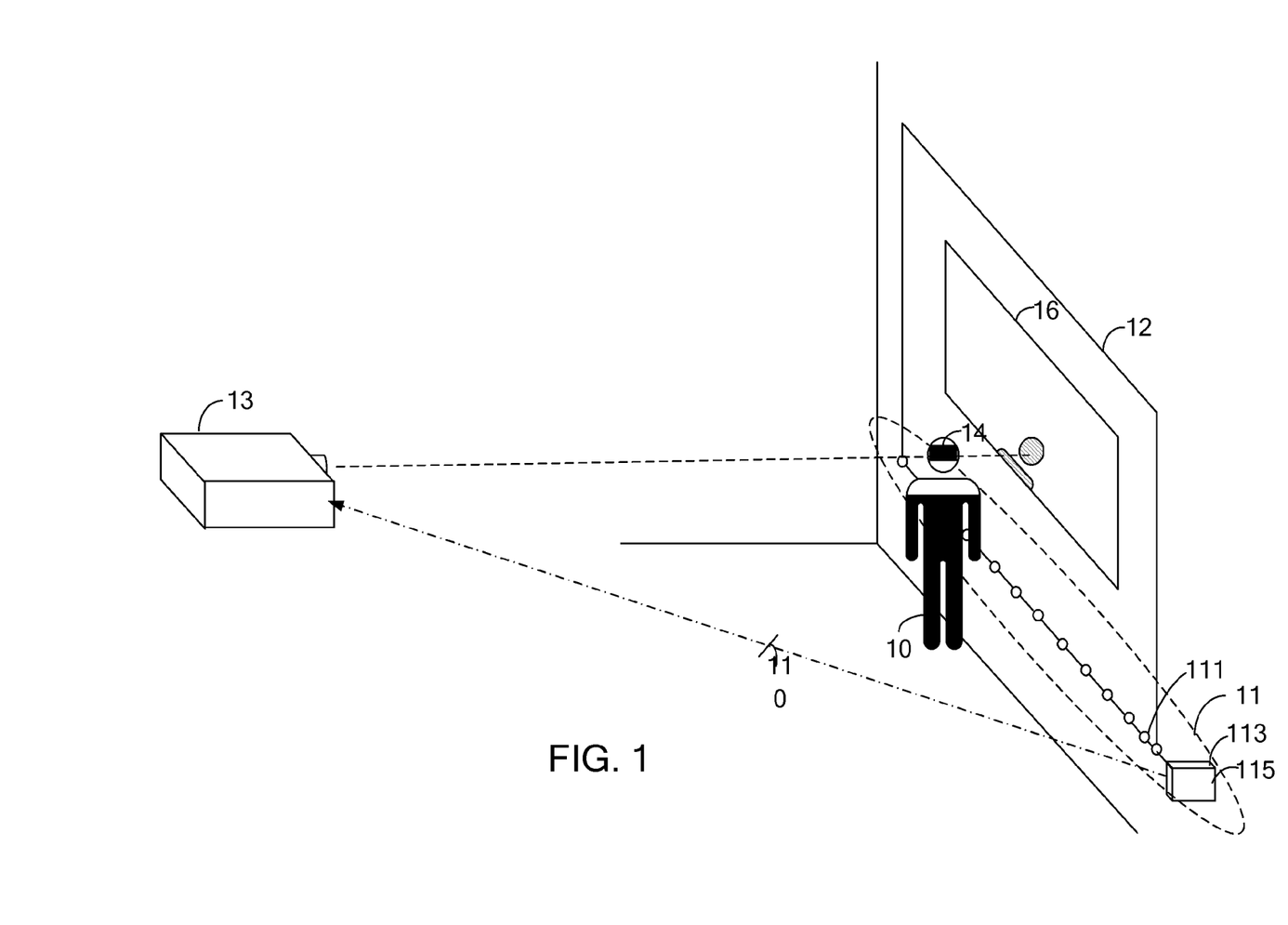
FIG. 1 is a schematic diagram of the projection system of the first embodiment of the present invention.
Figure 2:
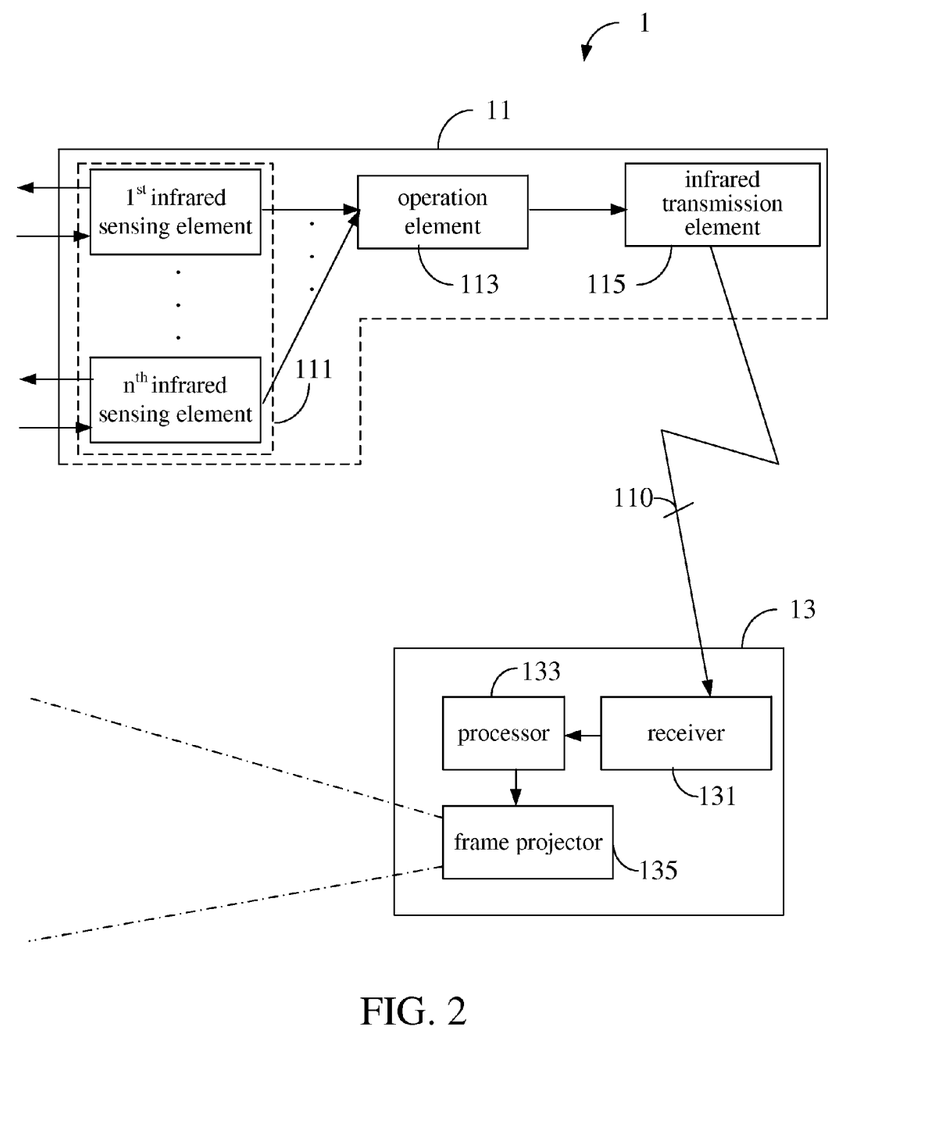
FIG. 2 is a block diagram of the projection system of the first embodiment of the present invention.

A projection system 1 of a first embodiment of the present invention is depicted in FIGS. 1 and 2. The projection system 1 comprises a sensor 11 and a projection apparatus 13 where signals can be transmitted. In this embodiment, the signals are transmitted wirelessly through infrared rays; however, in other embodiments, radio signals, ultrasonic signals and other wireless signals can also be used for the transmission. Furthermore, the transmissions between the sensor 11 and the projection apparatus 13 can also occur through electronic signals via a wire line, such as a transmission line or an optical fiber. The signals generated by the sensors 11 in this case would be transmitted to the projection apparatus 13.

The sensor 11 located below the screen 12 is configured to sense a horizontal position of a user 10 in front of the screen 12. In response, the sensor transmits a horizontal position signal 110 to the projection apparatus 13. The horizontal position signal 110 is a wireless signal, such as an infrared signal. As depicted in FIG. 2, the sensor 11 is an infrared sensing apparatus comprising a plurality of infrared sensing elements 111, an operation element 113 and an infrared transmission element 115. The infrared sensing elements 111 are uniformly distributed below the screen 12 (i.e., the dots shown in FIG. 1). For example, in a 72-inch screen that is approximately 1.5 m wide and 1.1 m tall, eleven infrared sensing elements 111 are arranged along the lower edge of the screen 12 in intervals of 0.15 m. These infrared sensing elements 111 are configured to first detect obstructions in front of the screen 12, and then to transmit an obstruction information to the operation element 113. The obstruction information represents the presence of objects or people that obstruct the image from projecting on the screen 12. Once the user 10 stands in front of the screen 12, the infrared sensing elements 111 are then obstructed. The operation element 113 then converts this into the position information of the user 10 and sends it to the infrared transmission element 115, which then transmits an infrared signal (i.e., the horizontal position signal 110) to the projection apparatus 13 with a fixed frequency (e.g., once per 0.5 s).

The projection apparatus 13 is configured to generate a first display frame, which is a projection frame. The projection apparatus 13 comprises a receiver 131, a processor 133 and a frame projector 135. When the receiver 131 wirelessly receives the horizontal position signal 110, the processor 133 operates according to the horizontal position signal 110 to generate a second display frame, which in this embodiment, is an on screen display (OSD) 14. The OSD 14 can be projected onto the horizontal position of the user 10, and is superimposed onto the projection frame 16 according to its predetermined vertical projection position (e.g., the uppermost edge of the screen 12) on the screen 12.

The frame projector 135 is an optical projection apparatus, and can project the superimposed projection frame 16 onto the screen 12 so that the OSD 14 is displayed on the projection frame 16 in an area corresponding to both the horizontal position of the user 10 and the predetermined vertical position (i.e., the uppermost edge of the screen 12).

Before commencement of a presentation, the user 10 can adjust the vertical position of the OSD 14 on the screen 12 via a controller. The adjustment of the vertical position of the OSD 14 eliminates interference with the user's vision. That is, the vertical position of the OSD 14 is adjusted for covering the user's face. The controller may be a remote controller that transmits a wireless vertical position signal. It should be noted that, the vertical position of the OSD 14 on the screen 12 is fixed after the adjustment is completed. In addition, the vertical position signal is an infrared signal. The OSD 14 should also be a dark, preferably black, frame that covers the entire face or the upper half of the user's 10 body without interfering the user's vision. Thus, the OSD is not limited in shape.

During the adjustment, the receiver 131 also receives the wireless vertical position signal. The processor 133 processes both the horizontal position signal 110 and the vertical position signal to generate the OSD 14, which is re-superimposed onto the projection frame 16. Finally, the superimposed projection frame 16 is projected onto the screen 12 by the frame projector 135.

The infrared sensing elements 115 of the sensor 11 transmit an infrared signal to the projection apparatus 13 with a fixed frequency, so when the user 10 changes his or her horizontal position, the horizontal position signal 110 and the OSD 14 can change accordingly. Thus the user can move around during the presentation without being interfered.

Figure 3A:
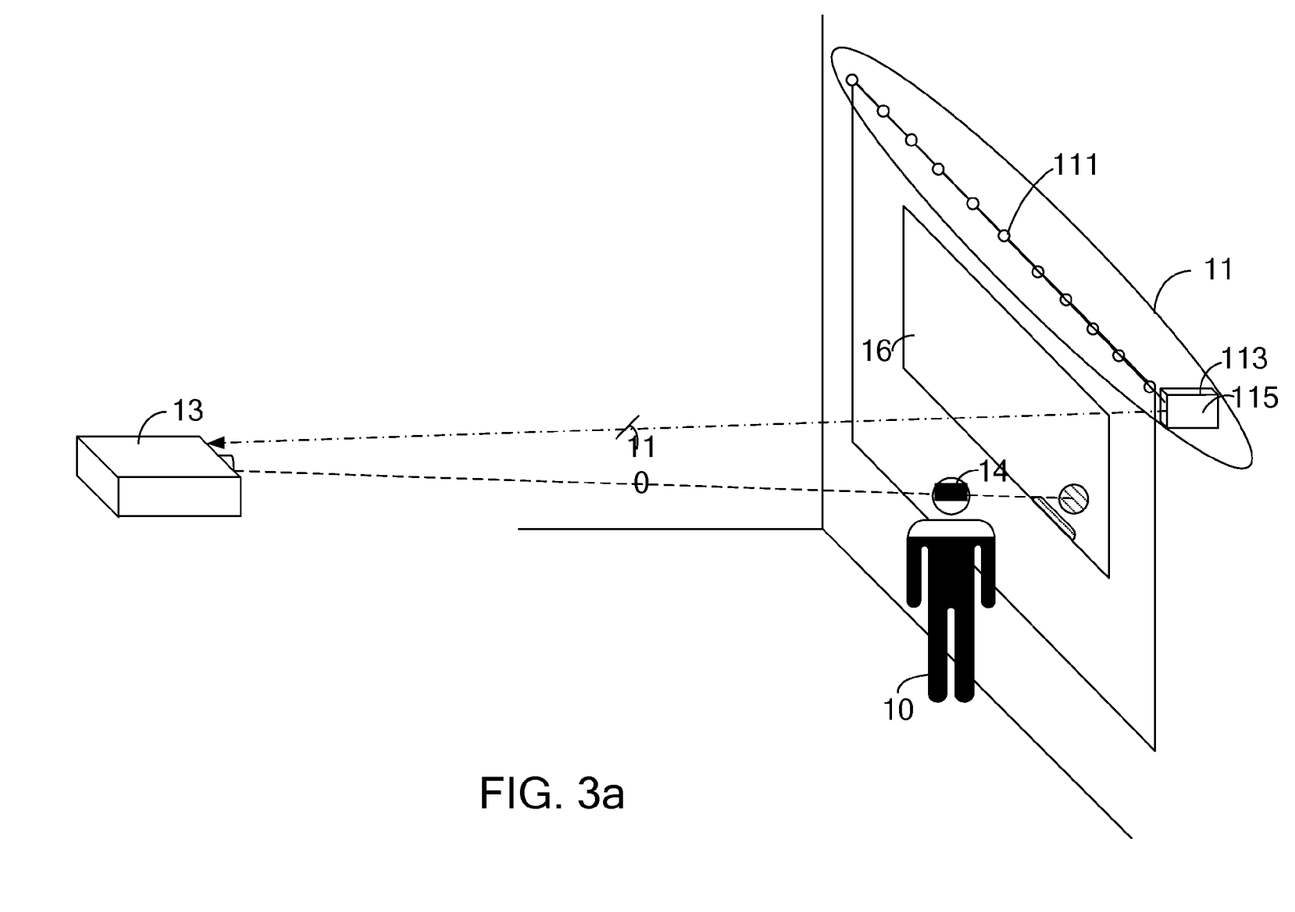
FIG. 3a is a schematic diagram illustrating another aspect of the first embodiment of the present invention.
Figure 3B:
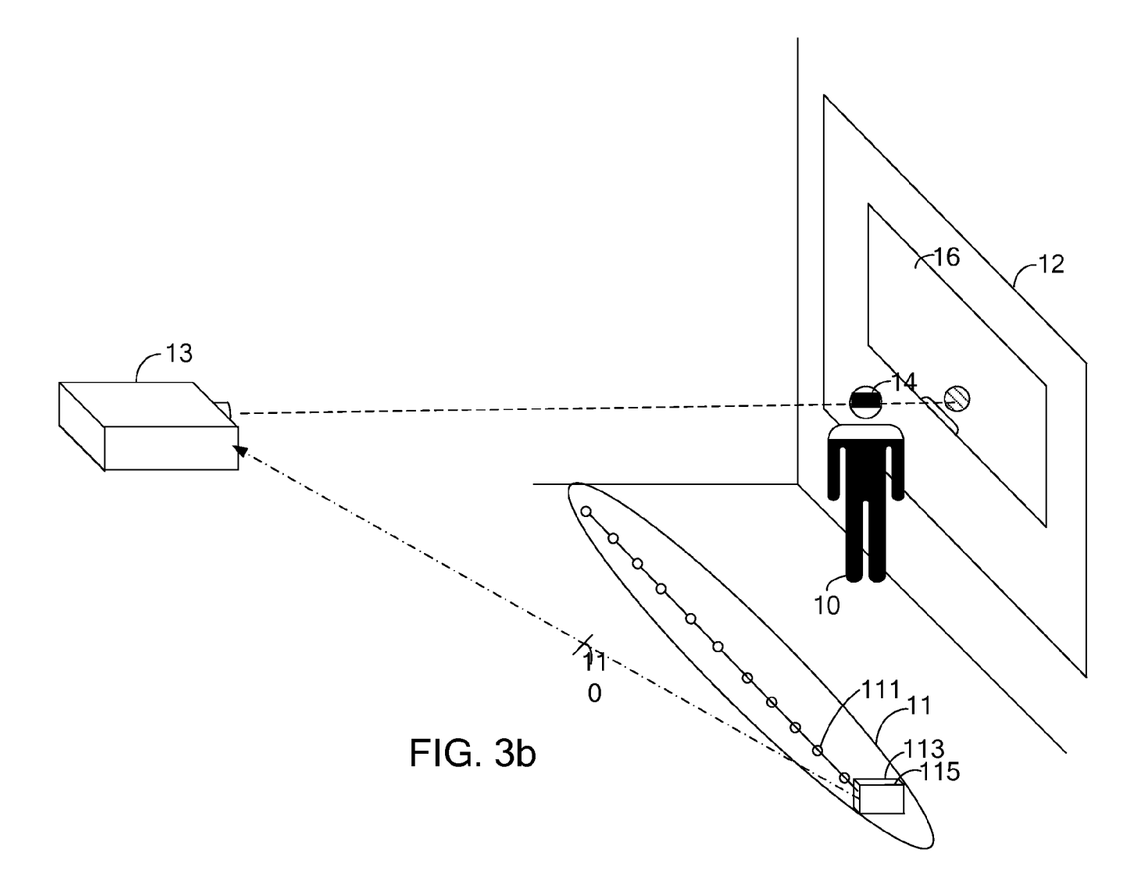
FIG. 3b is a schematic diagram illustrating yet another aspect of the first embodiment of the present invention.
Figure 3C:
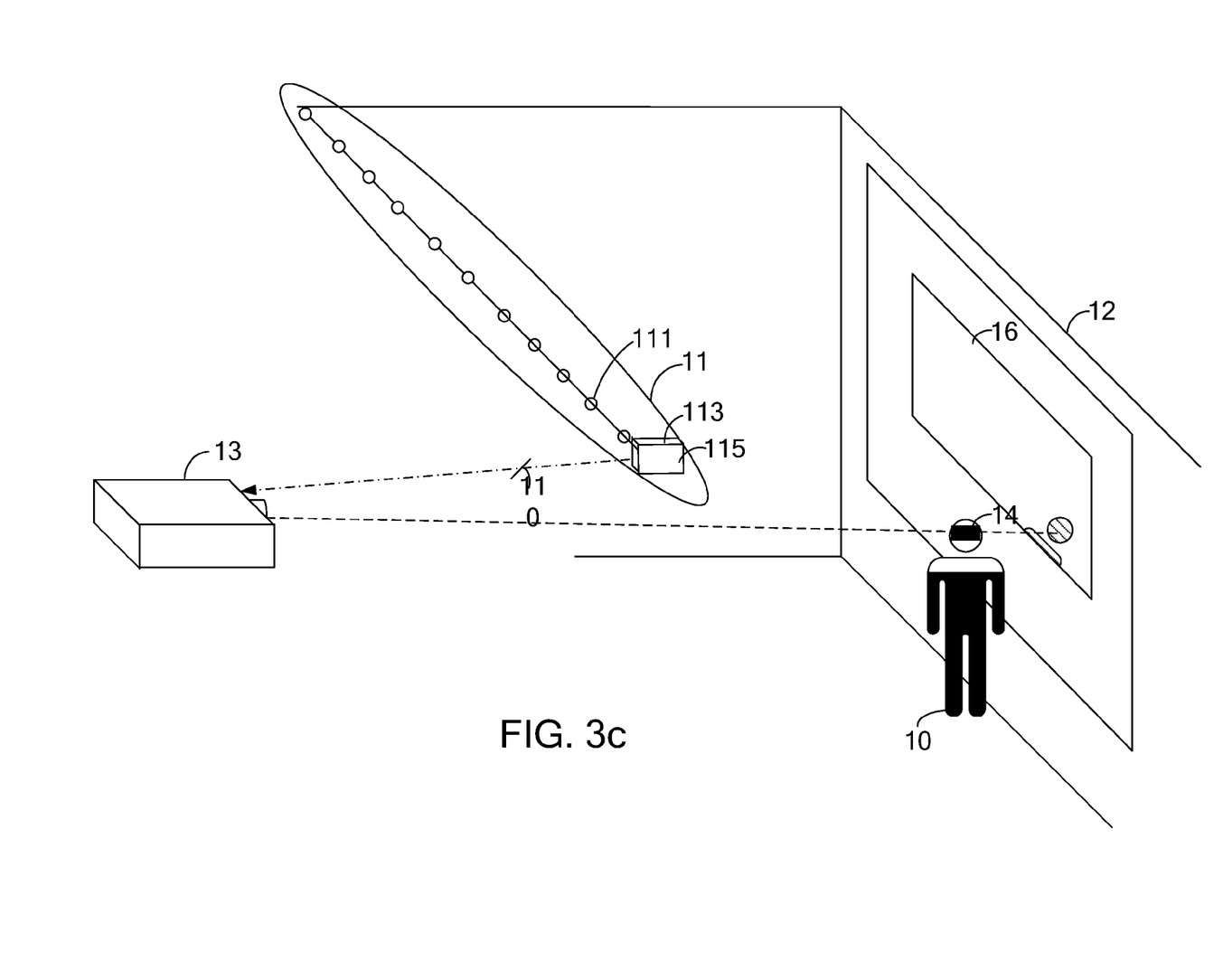
FIG. 3c is a schematic diagram illustrating still another aspect of the first embodiment of the present invention.

The aforementioned sensor 11 can either be located (1) on the upper edge of the screen 12 (with the infrared sensing elements 111 tilted downwards at a specific angle aligned with the user 10), (2) on the floor between the user 10 and the projection apparatus 13 (with the infrared sensing elements 111 tilted towards the screen 12 at a specific angle aligned with the user 10), or (3) on the ceiling between the user 10 and the projection apparatus 13 (with the infrared sensing elements 111 tilted downwards at a specific angle aligned with the user 10). These options are depicted in FIGS. 3a, 3b and 3c respectively.

Figure 4:
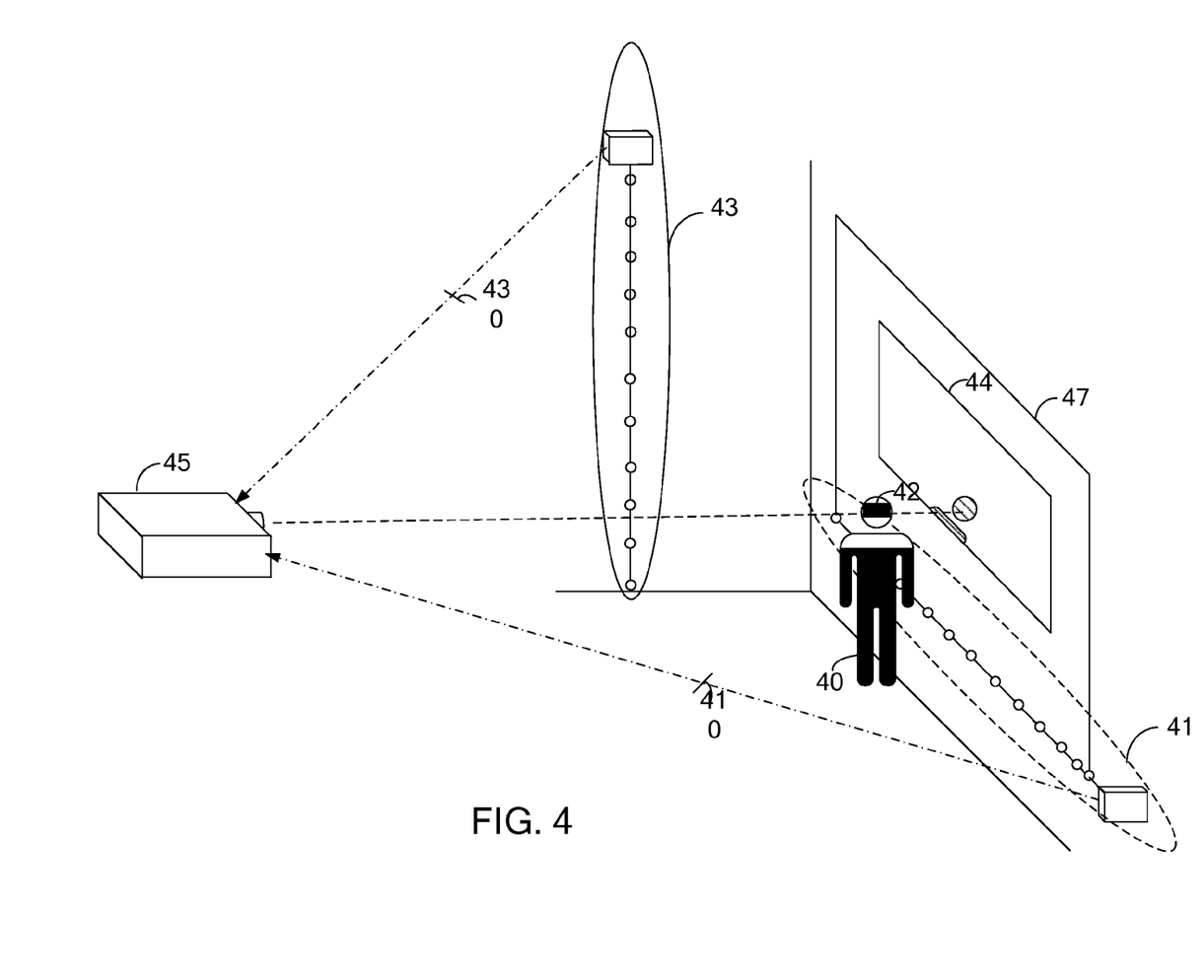
FIG. 4 is a schematic diagram of the projection system of the second embodiment of the present invention.
Figure 5:
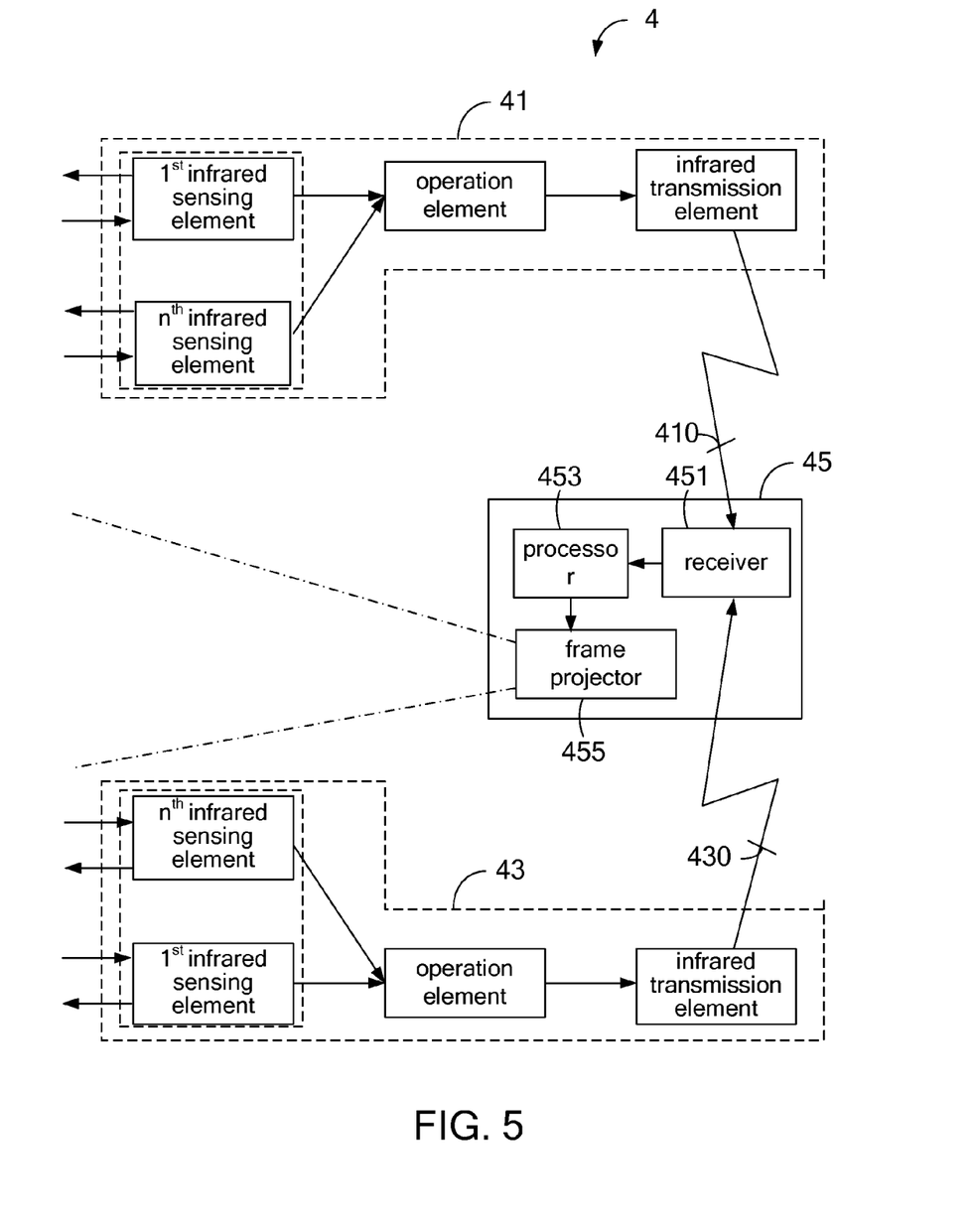
FIG. 5 is a block diagram of the projection system of the second embodiment of the present invention.

A second embodiment of the present invention is depicted in FIGS. 4 and 5. The projection system 4 comprises a first sensor 41, a second sensor 43 and a projection apparatus 45 which communicates with the first sensor 41 and the second sensor 43 through wireless signals respectively. In this embodiment, the wireless transmission occurs through infrared rays; however, in other embodiments, radio signals, ultrasonic signals and other wireless signals can also be used for the transmission.

In this embodiment, the first sensor 41 is like that of the first embodiment and is configured to detect the horizontal position of the user 40. The second sensor 43 is located on the sidewall between the screen 47 and the projection apparatus 45, and is configured to detect the vertical position of the user 40 in front of the screen 47 to transmit the vertical position signal 430 to the projection apparatus 45. The vertical position signal 430 is a wireless signal, specifically, an infrared signal. The second sensor 43 is also an infrared sensing device, and comprises a plurality of infrared transmission and reception elements, which are uniformly distributed on the right wall of the room for using the projection system 4 and perpendicular to the floor. Again, in a 72-inch screen that is approximately 1.5 m wide and 1.1 m tall, eleven infrared transmission and reception elements are arranged on the sidewall at intervals of 0.11 m within the height of the screen 47. These infrared transmission and reception elements are configured to transmit an infrared signal (i.e., the vertical position signal 430) to the projection apparatus 45 with the same frequency as the first sensor 41 (e.g., once per 0.5 s) and at times interlacing with the horizontal position signal 410.

The projection apparatus 45 also comprises a receiver 451, a processor 453 and a frame projector 455. When the receiver 451 receives the horizontal position signal 410 and the vertical position signal 430 in the respective wireless transmissions, the processor 453 uses the two position signals to generate an on screen display (OSD) 42. The OSD 42 is projected to an area corresponding to the horizontal and the vertical positions of the user 40, and is superimposed onto a projection frame 44. Then, the superimposed frame is projected onto the screen 47 by the frame projector 455, with the OSD 42 appearing in the area corresponding to the horizontal and the vertical positions of the user 40 in the projection frame 44.

The infrared elements employed in the embodiments described above have a much lower cost than that of the video camera used in the projection systems of the prior art. Moreover, the projection apparatus of this invention requires no additional internal devices, nor does it require an improved processing capacity to deal with the complex image processing operations.

Since most of the modern projectors in the market are able to receive infrared rays and display OSD frames, this invention can be implemented through simple manual controls without the need of complex light sources and video cameras, thus, reducing the cost and complexity of the products significantly. This invention also utilizes sensors for signal reception and transmission and can be used with various projectors. For projectors that are unable to receive infrared rays, only a simple modification of the reception software is needed to allow compatibility with the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection apparatus, connected to an external sensor for sensing a horizontal position of a user in front of a screen and for transmitting a horizontal position signal, for generating a first display frame, the projection apparatus comprising:
    a receiver for receiving the horizontal position signal;
    a processor for generating a second display frame according to the horizontal position signal and for superimposing the second display frame on the first display frame; and
    a frame projector for projecting the superimposed frame on the screen, wherein the second display frame is displayed on the user after the superimposed frame is projected;
    wherein the external sensor comprises a plurality of sensing elements being away from the projection apparatus to locate between the projection apparatus and the screen for generating an obstruction information, and then the external sensor converts the obstruction information into the horizontal position signal, and wherein the processor computes the horizontal position of the second display frame on the screen according to the horizontal position signal, and pre-determines the vertical position of the second display frame on the screen.

2. The projection apparatus of claim 1, wherein the receiver is further configured to receive a vertical position signal, generated by the user's adjustment of the vertical position of the second display frame on the screen by a controller.

3. The projection apparatus of claim 2, wherein the receiver receives the vertical position signal by wireless transmission or wire transmission.

4. The projection apparatus of claim 1, wherein the receiver receives the horizontal position signal by wireless transmission or wire transmission.

5. The projection apparatus of claim 1, wherein the first display frame is an on screen display (OSD).

6. A projection system, comprising:
    a first sensor for sensing a horizontal position of a user in front of a screen and for transmitting a horizontal position signal; and
    a projection apparatus for generating a first display frame, comprising:
    a receiver for receiving the horizontal position signal;
    a processor for generating a second display frame according to the horizontal position signal and for superimposing the second display frame on the first display frame; and
    a frame projector for projecting the superimposed frame on the screen, wherein the second display frame is displayed on the user after the superimposed frame is projected;
    wherein the external sensor comprises a plurality of sensing elements being away from the projection apparatus to locate between the projection apparatus and the screen for generating an obstruction information, and then the external sensor converts the obstruction information into the horizontal position signal and wherein the processor computes the horizontal position of the second display frame on the screen according to the horizontal position signal, and pre-determines the vertical position of the second display frame on the screen.

7. The projection system of claim 6, wherein the receiver is further configured to receive a vertical position signal generated by the user's adjustment of the vertical position of the second display frame on the screen by a controller.

8. The projection system of claim 7, wherein the receiver receives the vertical position signal by wireless transmission or wire transmission.

9. The projection system of claim 6, further comprising a second sensor for sensing a vertical position of a user in front of the screen and for transmitting a vertical position signal, the receiver further receiving the vertical position signal, and the processor further generating the second display frame according to the vertical position signal.

10. The projection system of claim 6, wherein the receiver receives the horizontal position signal by wireless transmission or wire transmission.

11. The projection system of claim 6, wherein the first display frame is an on screen display.

12. The projection system of claim 6, wherein the first sensor is located under the screen.

13. The projection system of claim 6, wherein the first sensor is located on a floor between the user and the projection apparatus.

14. The projection system of claim 6, wherein the first sensor is located on a ceiling between the user and the projection apparatus.

* * * * *